(12) United States Patent
Beckett et al.

(10) Patent No.: US 11,262,925 B2
(45) Date of Patent: Mar. 1, 2022

(54) PERFORMANCE PARTITIONING LEVERAGING DYNAMIC MASKING CHANGE

(71) Applicant: EMC IP Holding Company LLC, Hopkinton, MA (US)

(72) Inventors: Violet S. Beckett, Sutton, MA (US); Jaeyoo Jung, Shrewsbury, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 238 days.

(21) Appl. No.: 16/736,852

(22) Filed: Jan. 8, 2020

(65) Prior Publication Data

US 2021/0208805 A1 Jul. 8, 2021

(51) Int. Cl.
*G06F 3/00* (2006.01)
*G06F 3/06* (2006.01)
*G06F 11/07* (2006.01)

(52) U.S. Cl.
CPC ............ *G06F 3/0635* (2013.01); *G06F 3/067* (2013.01); *G06F 3/0611* (2013.01); *G06F 3/0653* (2013.01); *G06F 11/0757* (2013.01)

(58) Field of Classification Search
CPC ...... G06F 3/0635; G06F 3/067; G06F 3/0611; G06F 3/0649
USPC ......................................................... 711/154
See application file for complete search history.

(56) References Cited

U.S. PATENT DOCUMENTS

| | | | | |
|---|---|---|---|---|
| 8,443,153 B1* | 5/2013 | Edwards | ............. | G06F 11/1076 711/147 |
| 8,555,022 B1* | 10/2013 | Edwards | ............... | G06F 3/0649 711/170 |
| 9,465,550 B1* | 10/2016 | Lippitt | .................. | G06F 3/0659 |
| 9,582,328 B1* | 2/2017 | Tao | .......................... | G06N 5/02 |
| 2011/0010161 A1* | 1/2011 | Das | ..................... | G06F 11/0727 703/22 |
| 2014/0019972 A1* | 1/2014 | Yahalom | ............. | G06F 9/45545 718/1 |
| 2014/0068184 A1* | 3/2014 | Edwards | ............... | G06F 3/0607 711/114 |

* cited by examiner

*Primary Examiner* — Titus Wong
(74) *Attorney, Agent, or Firm* — Muirhead and Saturnelli, LLC

(57) ABSTRACT

Techniques for configuring paths for transmitting I/O operations may include: configuring a first path over which logical devices are exposed over a first port of a data storage system to a second port of a host, wherein the logical devices include a first logical device having a first service level objective and a second logical device having a second service level objective denoting a lower service level than the first service level objective; determining whether there is a service level objective violation of the first service level for the first logical device; and responsive to determining there is a service level objective violation for the first logical device, performing first processing that exposes the first logical device and the second logical device over different ports of the data storage system. Masking information may indicate which logical devices are exposed over which data storage system ports to which host ports.

20 Claims, 12 Drawing Sheets

PERFORMANCE PARTITIONING LEVERAGING DYNAMIC MASKING CHANGE

BACKGROUND

Technical Field

This application generally relates to data storage, and in particular, configuring paths for issuing I/O operations.

Description of Related Art

Data storage systems may include resources used by one or more host systems. Data storage systems and host systems may be interconnected by one or more communication connections such as in a network. These resources may include, for example, data storage devices such as those included in the data storage systems. These data storage systems may be coupled to one or more host systems where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations sent to the data storage system.

Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

An application may execute on a host where the application performs I/O (input/output) operations. The host may be able to transmit the data operation to the data storage system over any one or more different paths or multiple paths. Multipathing functionality, such as for path selection and management of the multiple paths, may be handled by a device driver of the host. When an application on the host issues an I/O operation, it may be received by a device driver of the host which facilitates sending and/or receiving transmissions between the application and the data storage system.

SUMMARY OF THE INVENTION

Various embodiments of the techniques herein may include a method, a system and a computer readable medium for configuring paths for transmitting I/O operations. Processing performed may include: configuring a first path over which a plurality of logical devices are exposed over a first port of a data storage system to a second port of a host, wherein the plurality of logical devices includes a first logical device having a first service level objective and a second logical device having a second service level objective denoting a lower service level than the first service level objective, wherein masking information indicates that the first logical device and the second logical device are exposed over the first port of the data storage system to the second port of the host; determining whether there is a service level objective violation of the first service level for the first logical device; and responsive to determining that there is a service level objective violation of the first service level for the first logical device, performing first processing that exposes the first logical device and the second logical device over different ports of the data storage system. The first processing may include updating the masking information to relocate one of the first logical device and the second logical device from the first port of the data storage system to a third port of the data storage system.

In at least one embodiment, the first processing may include relocating the first logical device from the first port to the third port of the data storage system whereby the first logical device is exposed to the host over the third port of the data storage system and the second logical device is exposed over to the host the first port of the data storage system.

In at least one embodiment, the first processing may include relocating the second logical device from the first port to the third port of the data storage system whereby the second logical device is exposed to the host over the third port of the data storage system and the first logical device is exposed to the host over the first port of the data storage system.

In at least one embodiment, processing performed may include responsive to updating the masking information, sending a notification to the host. The notification may identify a plurality of ports of the data storage system having a configuration change due to the updating of the masking information, and wherein the plurality of ports of the data storage system may include the first port and the third port of the data storage system. The host may perform discovery processing responsive to receiving, and wherein said discovery processing rediscovers which logical devices are exposed over the first port and the third port of the data storage system.

In at least one embodiment, the first service level objective may be an I/O performance objective for the first logical device, the second service level objective may be an I/O performance objective for the second logical device, and I/Os directed to the first logical device may have higher priority than I/Os directed to the second logical device. The first service level objective may include a first I/O performance target metric for the first logical device and the second service level objective may include a second I/O performance target metric for the second logical device. The first I/O performance target metric may denote a first I/O response time target for I/Os directed to the first logical device, and the second I/O performance target metric may denote a second I/O response time target for I/Os directed to the second logical device. The service level objective violation of the first service level for the first logical device may occur when an observed I/O response time for I/Os directed to the first logical device exceeds the first I/O response time target.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
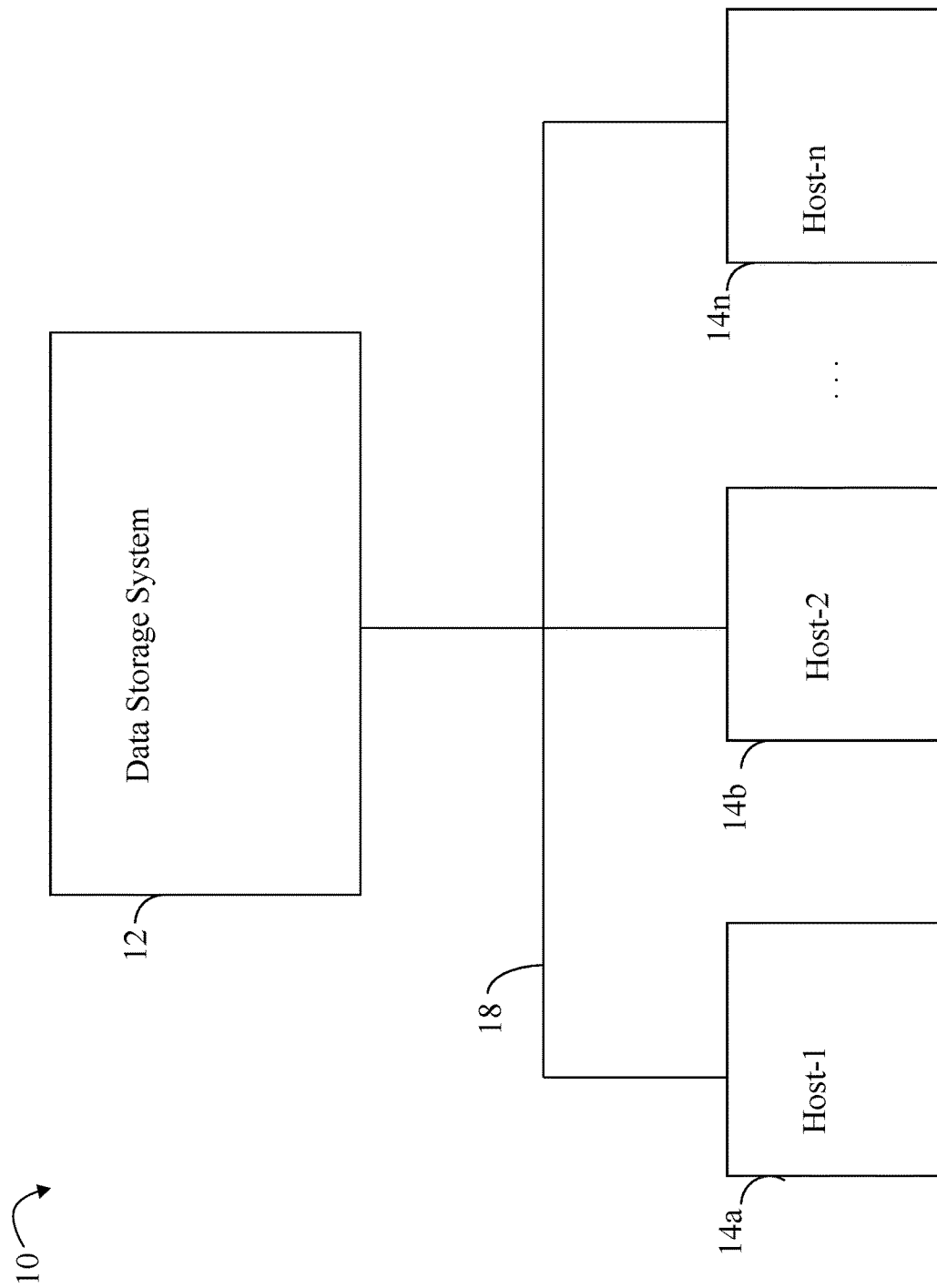
FIG. 1 is an example of an embodiment of a system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, NVMe (Non-Volatile Memory Express) over Fabrics, and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, as well one or more other data storage systems as may vary with the embodiment.

Figure 2A:
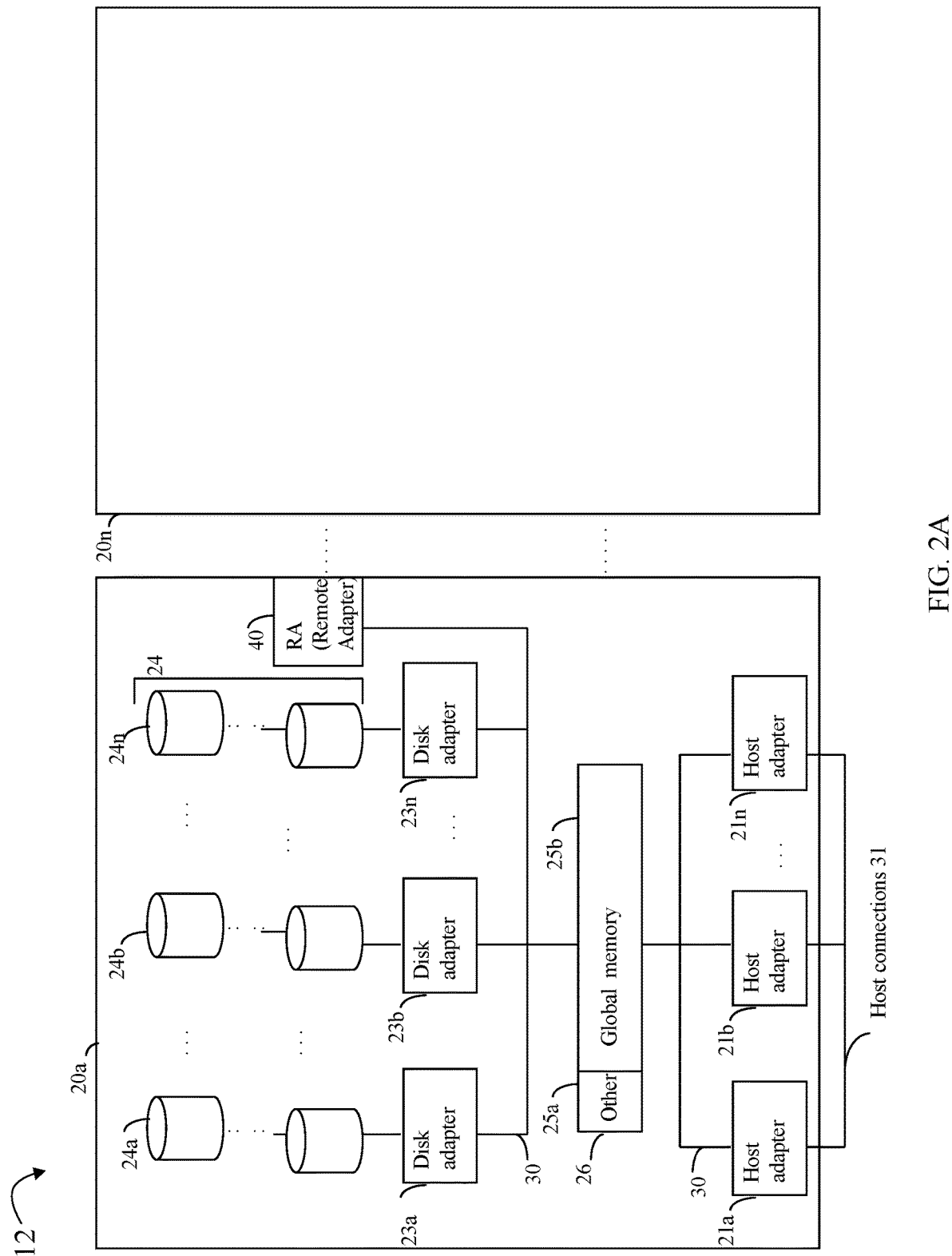
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage, a backend DA may also be referred to as a disk controller. The DA may perform operations such as reading data from, and writing data to, the physical devices which are serviced by the DA.

It should be noted that, more generally, the physical devices or data storage devices 24a-24n may be any suitable type of physical storage device or media, such as any form of suitable back-end non-volatile storage device. For example, physical devices included in an embodiment of a data storage system may include one or more types of rotating disk drives (e.g., SATA, SAS, FC 15K RPM, FC 10K RPM), one or more types of flash-based storage devices (e.g., SLC (single level cell) flash, MLC (multi-level cell) flash, TLC, (tri-level cell) flash) or more generally solid state drives (SSDs), and the like.

Also shown in the storage system 20a is an RA or remote adapter 40. The RA may be hardware including a processor used to facilitate communication between data storage systems, such as between two of the same or different types of data storage systems.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host (e.g., receive host I/O commands and send responses to the host) may also be referred to as front end components. A component of the data storage system which communicates with a front end component may be characterized as a backend component, such as a DA. In connection with data storage systems, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

The DA physically accesses the back-end non-volatile storage devices, such as physical data storage devices (PDs) denoted by 24 of FIG. 2A. Data residing on a PD may be accessed by the DA following a data request in connection with I/O operations that other directors originate. In at least one embodiment, write data received at the data storage system from a host or other client may be initially written to cache memory (e.g., such as may be included in the component designated as 25b) and marked as write pending. Once written to cache, the host may be notified that the write operation has completed. At a later point time, the write data may be destaged from cache to the physical storage device, such as the non-volatile physical storage device (PDs of 24) accessed by a DA. In connection with reads, processing may include first looking to see if the requested read data is in cache whereby a read hit occurs. For a read hit, the read is serviced using the cached copy of the requested read data by returned the cached read data to the requester. Thus, with a read hit, there is no need to access the physical (back end) non-volatile storage by the DA to obtain the requested read data thereby resulting in a faster read I/O response time. If the requested read data is not in cache, the requested read data is obtained from the physical (back end) non-volatile storage by the DA where the read data is then stored in the cache, and returned to the requester. The cached copy of the read data may then be available to further service any other subsequent reads. As known in the art, any suitable cache management techniques may be used to maintain the cache, for example, such as is determining how long data remains in cache, whether to prefetch data, selecting data stored in the cache for eviction, and the like.

Figure 2B:
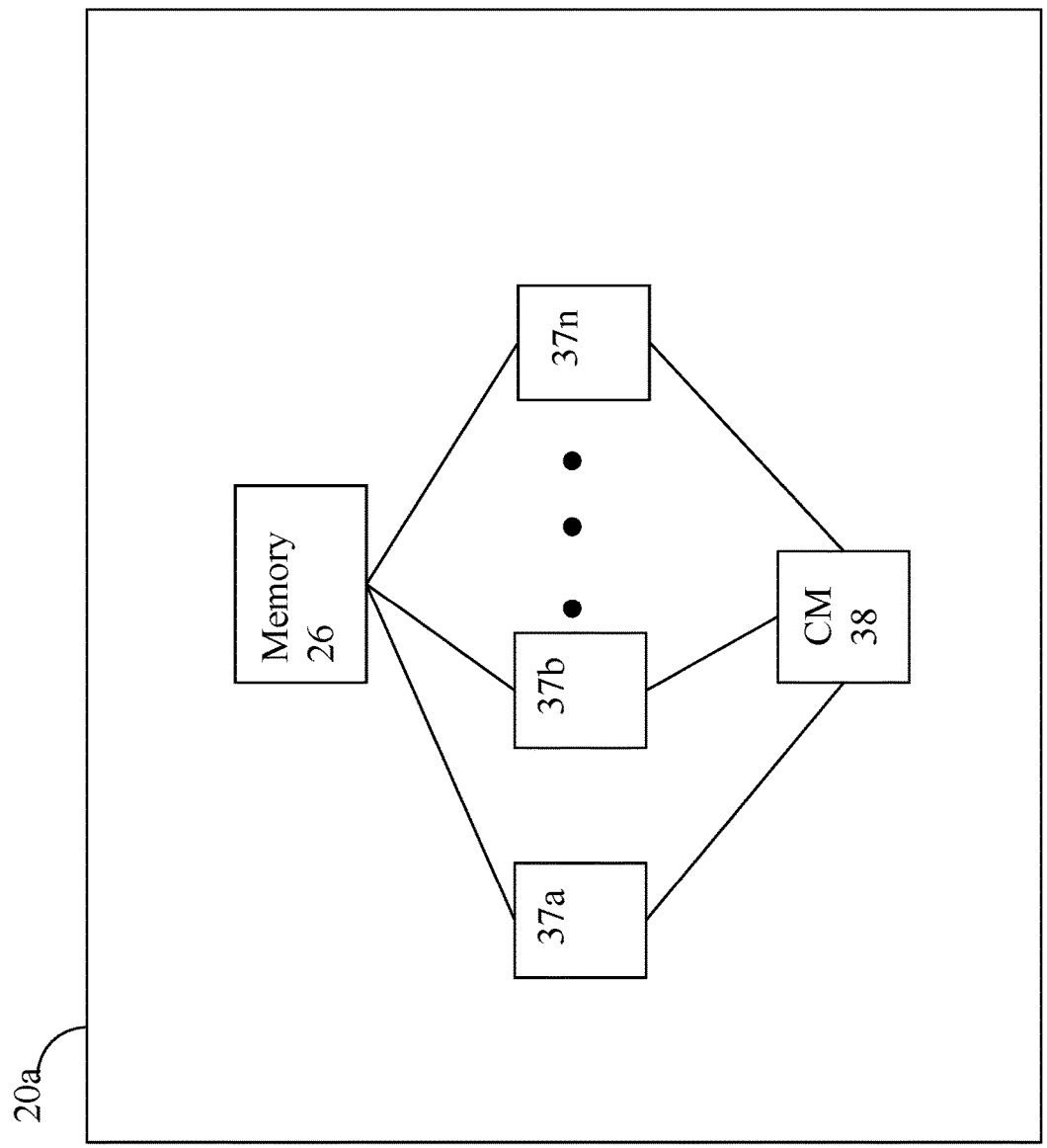
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Figure 3:
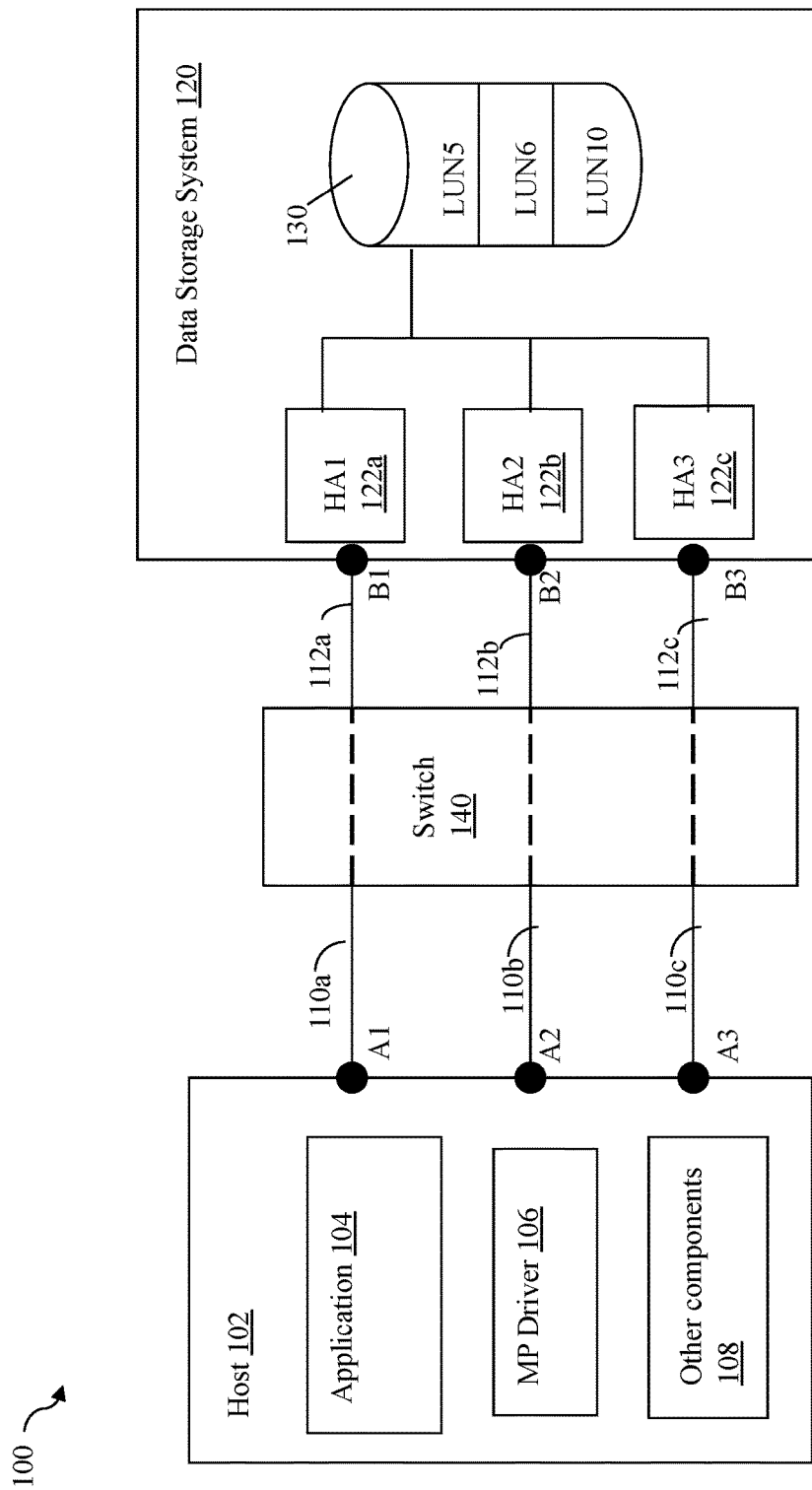
FIG. 3 is an example of systems and components that may be used in connection with techniques herein.

Referring to FIG. 3, shown is an example of an embodiment of a system that may be utilized in connection with techniques herein. The example 100 includes a host 102, switch 140 and data storage system 120. The host 102 and data storage system 120 may communicate over one or more paths through the switch 140. Elements 110a-110c denote connections between the host 102 and switch 140. Element 112a-112c denote connections between the data storage system 120 and the switch 140. Element 130 may represent a physical device of the data storage system 120 where the physical device 130 may be configured to include 3 LUNs—LUN5, LUN6 and LUN10. It should be noted that the example 100 includes only a single host, single physical device 130 with 3 LUNs, a single data storage system, and a fabric including a single switch for purposes of simplicity to illustrate the techniques herein.

The host 102 may include an application 104, a multi-path (MP) driver 106 and other components 108 whereby element 108 may also include one or more other device drivers and other code. An I/O operation from the application 104 may be communicated to the data storage system 120 using the MP driver 106 and one or more other components represented by element 108. The application 104 may be a database or other application which issues data operations, such as I/O operations, to the data storage system 120. Each of the I/O operations may be directed to a device, such as one of the LUNs of device 130, configured to be accessible to the host 102 over multiple physical paths. As such, each of the I/O operations may be forwarded from the application 104 to the data storage system 120 over one of the possible multiple paths. The MP driver 106 may include functionality to perform any one or more different types of processing such as related to encryption, multipathing, mirroring, migration, and the like. For example, the MP driver 106 may include multipathing functionality for management and use of multiple paths. For example, the MP driver 106 may perform path selection to select one of the possible multiple paths based on one or more criteria such as load balancing to distribute I/O requests for the target device across available active paths. Load balancing may be performed to provide for better resource utilization and increased performance of the host, data storage system, and network or other connection infrastructure. The MP driver 106 may be included in a commercially available product such as, for example, Dell® EMC PowerPath® software by Dell Inc. The host 102 may also include other components 108 such as one or more other layers of software used in connection with communicating the I/O operation from the host to the data storage system 120. For example, element 108 may include Fibre Channel (FC), SCSI and/or NVMe drivers, a logical volume manager (LVM), and the like. It should be noted that element 108 may include software or other components used when sending an I/O operation from the application 104 where such components include those invoked in the call stack above the MP driver 106 and also below the MP driver 106. For example, application 104 may issue an I/O operation which is communicated in a call stack including an LVM, the MP driver 106, and an FC, SCSI or NVMe driver. This is described in more detail below such as with a subsequent figure.

The data storage system 120 may include one or more physical data storage devices, such as device 130, where each such physical device may be configured to store data of one or more LUNs as described above. Each of the LUNs having data stored on the device 130 may be configured to be accessible to the host through multiple paths. For example, all LUNs of 130 may be accessible using ports of the three front end directors or interfaces 122a-122c, also denoted respectively HA1, HA2 and HA3. The multiple paths allow the application I/Os to be routed over multiple paths and, more generally, allow the LUNs of device 130 to be accessed over multiple paths. In the event that there is a component failure in one of the multiple paths, application I/Os can be easily routed over other alternate paths unaffected by the component failure. Thus, an embodiment of the MP driver 106 may also perform other processing in addition to load balancing in connection with path selection. The MP driver 106 may be aware of, and may monitor, all paths between the host and the LUNs of the device 130 in order to determine that particular state of such paths with respect to the various LUNs. In this manner, the MP driver may determine which of the multiple paths over which a LUN is visible may be used for issuing I/O operations successfully, and to use such information to select a path for host-data storage system communications issued to a particular LUN.

In the example 100, each of the LUNs of the device 130 may be configured as accessible through three paths. Each path may be represented by two path endpoints—a first endpoint on the host 102 and a second endpoint on the data storage system 120. The first endpoint may correspond to a port of a host component, such as a host bus adapter (HBA) of the host 102, and the second endpoint may correspond to a port of a data storage system component, such as a port of an HA of the data storage system 120. In the example 100, elements A1, A2 and A3 each denote a port of a host 102 (e.g. such as a port of an HBA), and elements B1, B2 and B3 each denote a target port of an HA of the data storage system 120. Each of the LUNs of the device 130 may be accessible over three paths—a first path represented by A1-B1, a second path represented by A2-B2 and a third path represented by A3-B3.

Figure 4:
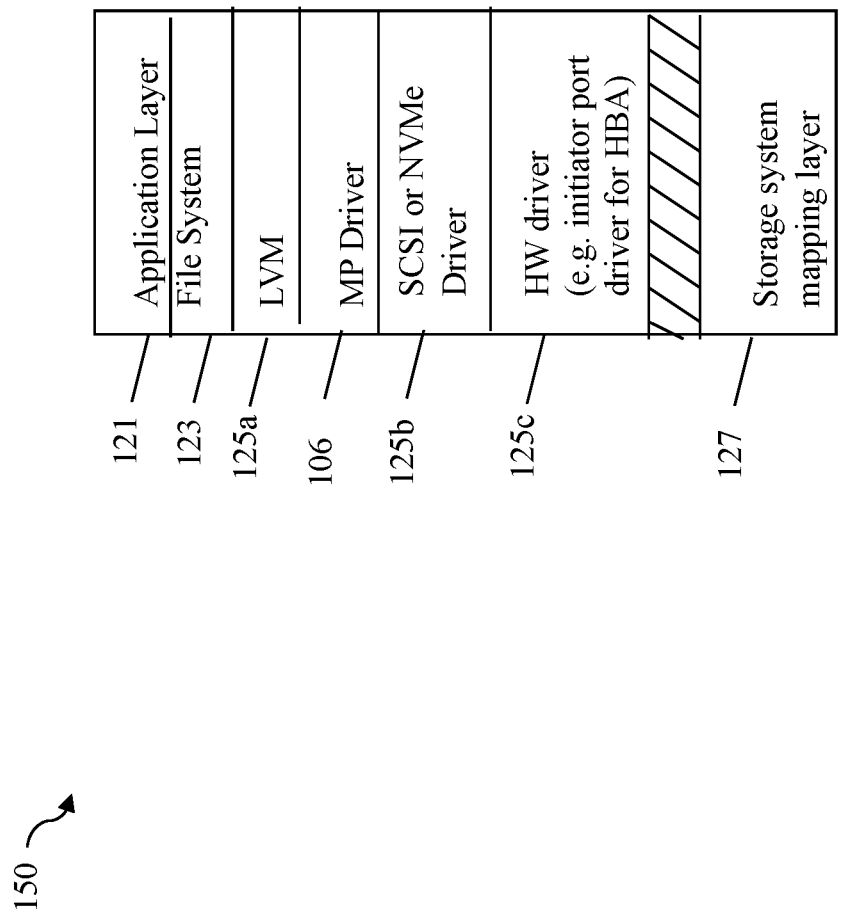
FIG. 4 is an example of different software layers that may be included in a host and data storage system in an embodiment in accordance with techniques herein.

Referring to FIG. 4, shown is a representation of a number of mapping layers that may be included in a computer system, such as host 102 of FIG. 3, in combination with a data storage system. FIG. 4 provides further detail regarding various software layers that may be used in connection with the MP driver 106 of FIG. 3.

In an embodiment in accordance with techniques herein, the data storage system as generally described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The various software layers of 150 may generally form layers included in the runtime I/O stack, such as when an I/O request is issued by an application on a host to a data storage system. The system includes an application layer 121 which includes application programs executing on the host computer 102. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host may perceive as corresponding to a physical device address (e.g., the address of one of the disk drives) within the storage system 12. Below the LVM layer 125a may be the MP (multipath) driver 106 which handles processing of the I/O received from layer 125a. The MP driver 106 may include a base driver and one or more driver extension modules. The MP driver 106 may be included in a commercially available product such as Dell® EMC PowerPath® software. Functionality for performing multipathing operations by multipathing software, such as the MP driver 106, may be included in one of the driver extension modules such as a multipath extension module. As described above, the MP driver may perform processing in connection with multiple path management and selecting one of a plurality of possible paths for use in connection with processing I/O operations and communicating with the data storage system, such as 120 of FIG. 3. More generally, one or more layers between the application layer 121 and the MP driver 106 may provide for mapping a LUN (such as used in connection with block-based storage) presented by the data storage system to the host to another logical data storage entity, such as a file, that may be used by the application layer 123. Below the MP driver 106 may be the SCSI or NVMe driver 125b and a hardware (HW) driver 125c. In at least one embodiment the driver 125b may be a SCSI driver that handles processing of a received I/O request from the MP driver 106 such as related to forming a request in accordance with the SCSI standard. As a variation, in at least one embodiment, the driver 125b may be an NVMe driver that handles processing of a received I/O request from the MP driver 106 such as related to forming a request in accordance with the NVMe standard. At least one embodiment in accordance with the techniques herein may operate in accordance with the NVMe protocol as described, for example, in the NVM Express™ Base Specification, Revision 1.4, Jun. 10, 2019, available at nvmexpress.org/wp-content/uploads/NVM-Express-1_4-2019.06.10-Ratified.pdf. The driver 125c may be a HW driver that facilitates communication with hardware on the host. The driver 125c may be, for example, a driver for an HBA of the host which sends commands or requests to the data storage system and also receives responses and other communications from the data storage system.

In some embodiments, the data storage system 120 may be an intelligent data storage system having its own mapping layer 127 such that the LUN known or exposed to the host may not directly correspond to a physical device such as a disk drive. In such embodiments, the LUN provided by the host in connection with the I/O operation may be further mapped by the data storage system using its mapping layer 127. For example, a LUN provided by the host may be mapped by the data storage system to one or more physical drives, multiple LUNs may be located on a same physical device, multiple physical drives, and the like. In other embodiments, the data storage system may not include such a mapping layer 127.

The MP driver 106, as well as other components illustrated in FIG. 4, may execute in kernel mode or other privileged execution mode. In one embodiment using a Unix-based operating system, the MP driver 106 may execute in kernel mode. In contrast, an application such as represented by application layer 121 may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, a virtualized environment, such as using the VMware™ ESX hypervisor by VMware, Inc, and the like.

In operation, an application executing at application layer 121 may issue one or more I/O operations (e.g., read and write commands or operations) to logical volumes (implemented by the LVM 125a) or files (implemented using the file system 123) whereby such I/O operation may be then mapped to data operations directed to LUNs of the data storage system. Such I/O operations from the application layer 121 may be directed to the MP driver 106 after passing through any intervening layers such as layers 123 and 125a. It should be noted that, in some embodiments, the MP driver 106 may also be below the SCSI or NVMe driver 125b.

In connection with the SCSI standard, a path may be defined between two ports as described above. A command may be sent from the host (as well as a component thereof such as a host bus adapter) and may be characterized as an initiator, originator or source with respect to the foregoing path. The host, as the initiator, sends requests to a data storage system (as well as a particular component thereof such as another HA having a port with a network address) characterized as a target, destination, receiver, or responder. Each physical connection of a path may be between a first endpoint which is a port of the host (e.g., such as of a host bus adapter having ports such as denoted as A1-A3 of FIG. 3) and a second endpoint which is a port of an HA (e.g., such as B1-B3 of FIG. 3) in the data storage system. Over each such path, one or more LUNs may be visible or exposed to the host initiator through the target port of the data storage system.

In connection with some protocols such as SCSI and NVMe, each path as related to sending and receiving of I/O commands may include 2 endpoints. As discussed herein, the host, or port thereof, may be an initiator with respect to I/Os issued from the host to a target port of the data storage system. In this case, the host and data storage system ports are examples of such endpoints. In connection with the NVMe protocol, communication of I/O operations or other commands may be bidirectional in that either endpoint may act as an initiator and either endpoint may act as a target. In contrast, with other protocols such as the SCSI protocol, communication may be unidirectional in that one of the endpoints, such as the host HBA port, is the initiator and the other endpoint, such as the data storage system target port, is the target receiving the commands from the initiator.

An I/O command or operation, such as a read or write operation, from the host to the data storage system may be directed to a LUN and a logical address or location in the LUN's logical address space. The logical address or location of the LUN may be characterized as the target logical address of the I/O operation. The target logical address or location of the I/O operation may identify a logical block address (LBA) within the defined logical address space of the LUN. The I/O command may include various information such as identify the particular type of I/O command as read or write, identify the target logical address (e.g., LUN and LUN logical address) of the I/O command, and other information. In connection with servicing the I/O operation, the data storage system may map the target logical address to a physical storage location on a PD of the data storage system. The physical storage location may denote the physical storage allocated or provisioned and also mapped to the target logical address.

In at least one embodiment in accordance with techniques herein, zoning may be used in combination with masking. Generally, zoning specifies connectivity between the host and data storage system and masking may be used to further control or limit access to particular LUNs.

Masking may be generally characterized as a process performed on the data storage system that indicates which of the LUNs are exposed over which target ports to which initiators. For example target port B1 may be configured to have 100 LUNs attached or mapped to it where the 100 attached LUNs may be potentially exposed to any initiator. The masking information (also referred to herein as mask information, LUN mask information or masking views (MVs)) provides the HAs of the data storage system and their target ports with additional filtering or access control information identifying which of the 100 LUNs are exposed over which of the target ports to which host initiators. For example, with reference to FIG. 3, assume there are 100 LUNs attached or mapped internally in the data storage system to target port B1. In this example, masking information may indicate that only 3 of the 100 LUNs—specifically LUNs 5, 6 and 10—are exposed to each of the initiators A1, A2 and A3 over each of the target ports B1, B2 and B3.

In at least one embodiment in accordance with techniques herein and with reference back to FIG. 3, zoning may be performed with respect to the switch 140, or more generally, network fabric or switching fabric, whereby connectivity between the host 102 and data storage system 120 is specified. In a SAN, zoning may be performed for selectively allowing access to data only to certain users. Essentially, zoning allows an administrator to control who (e.g., which initiator(s)) can see what target ports in a SAN. Using zoning in combination with LUN masking as described herein provides control over who (e.g., what initiator(s)) can see what data/devices (e.g., LUNs) over which target ports in a SAN. Zoning is generally known in the art. Zones may be created by grouping world wide names (WWNs) of host interfaces (e.g., host initiator ports) and data storage system interfaces (e.g., target ports) into zones. The set of zones created may be placed into a zone set which is then activated on the fabric, such as the switching fabric to define the connections between host initiators and target ports of the data storage system. Zoning may be performed by issuing requests or commands to the switch. For example, with reference back to FIG. 3, a host initiator may be host initiator port A3 which is zoned to target ports B1, B2 and B3 of the data storage system. Similarly, host initiator ports A1 and A2 may each be zoned to target ports B1, B2 and B3 of the data storage system. Once such zones are created and activated, the various affected ports may be notified by the switching fabric (e.g., via RSCN or registered state change notification in FC protocol) and can perform processing to discover the zoning changes and log into the switch to establish any new connections.

Thus, zoning may be generally characterized as defining connections providing connectivity between the various host initiators and target ports. Existing connectivity including a set of connections between the host initiators and target ports may be modified by accordingly modifying existing zoning information currently activated or in use by the switching fabric. Such modification may include any of creating a new zone, modifying and/or replacing zoning information of an existing zone, deleting an existing zone, and the like. A zoning modification may be made by issuing appropriate requests to the switching fabric.

In an embodiment in accordance with techniques herein using zoning and masking, zoning of switch 140 may be performed to define the connectivity between the host 102 and data storage system 120 through the switch 140. Masking may then be used by the data storage system to further control which LUNs of the data storage system 120 are exposed, accessible or visible, through which of the target ports B1-B3, to each of the initiators 110a-c of the host 102.

In some existing systems, after zoning of the switch is performed to define the connectivity between the host and data storage system, masking information may be specified and used by the data storage system 120. The masking information specifies which host initiators have access to which LUNs over which target ports of the data storage system 120.

In at least one embodiment in accordance with techniques herein, processing may be performed to define and create masking views specifying masking information. Such techniques may be performed after zoning of the one or more switches (e.g., switching or network fabric) is performed to define connectivity between the host(s) and data storage system(s). In at least one embodiment, a masking view (MV) may be created for each host. Each MV specified for a host may identify what LUNs are accessible to which initiators of the host over which of the target ports of the data storage system. Thus, each instance of an MV associated with a particular host may include a port group (PG), an initiator group (IG), and a device group or storage group (SG). The PG may identify one or more target ports of the data storage system. The IG may identify one or more initiators of the host associated with the MV instance. The SG may identify one or more LUNs. In this manner, the MV associated with a host may denote that the LUNs of the SG are accessible to the initiators (of the host) of the IG over target ports of the PG.

In one embodiment, each initiator and each target port of the data storage system may have an associated WWN and the masking information identifies which initiator WWNs are allowed to access particular LUNs on each target port WWN of the data storage system. In the MV for a host, the IG may identify the WWNs of host initiators and the PG may identify the WWNs of target ports of the data storage system.

In at least one embodiment in accordance with techniques herein, each host may be uniquely identified using an associated HOST NAME. The HOST NAME may be a customer-specified, human-readable name, such as an alphabetic or alphanumeric string providing an easier way for a human to reference or uniquely identify a particular host in a customer system (e.g., such as a customer SAN). In such an embodiment, the MV for a particular host may be associated with, or mapped to, the host's HOST NAME. In this way, the MV of a host may be indexed and accessed using the HOST NAME. Additionally, the HOST NAME may be mapped, indexed, or associated with one or more IP addresses (e.g., network addresses) of the host. An embodiment may therefore provide access to a host's MV through the host's HOST NAME and/or one or more of the host's network addresses that are mapped or associated with the HOST NAME.

Figure 5:
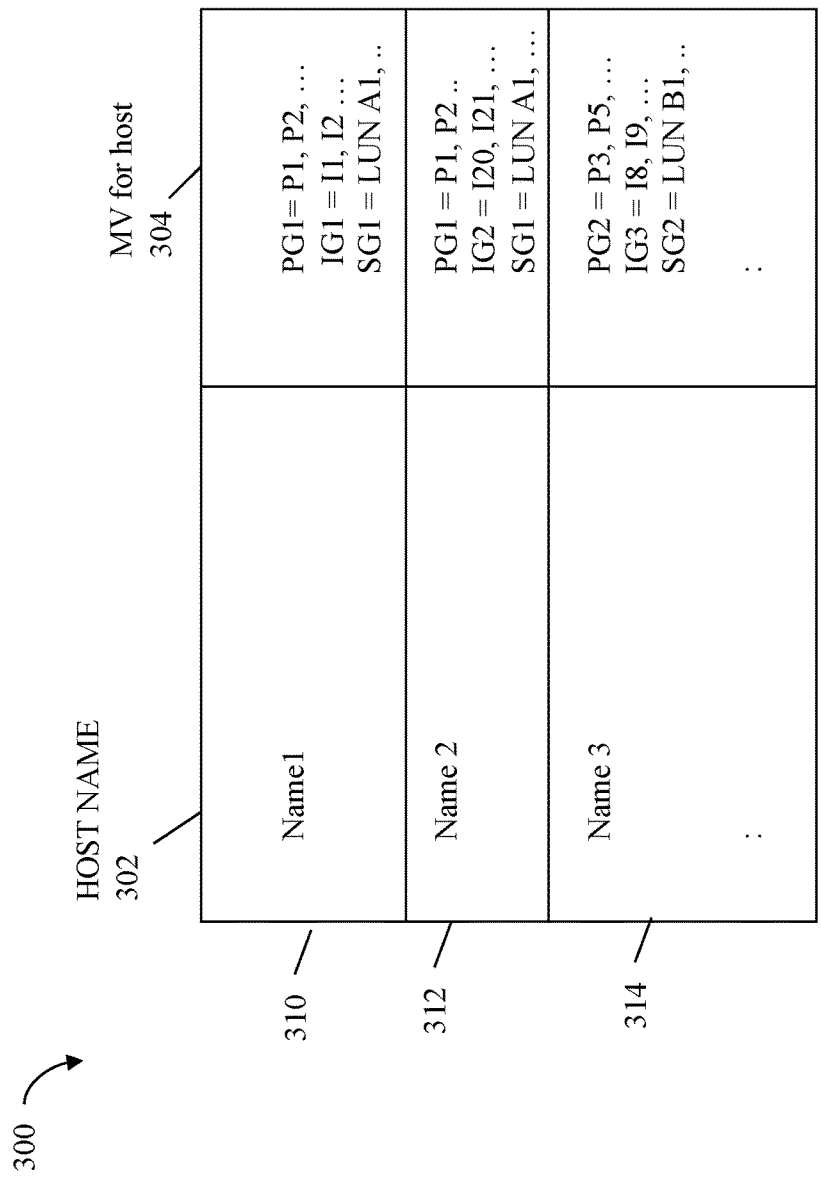
FIG. 5 is an example of information that may be included in a masking view defined for hosts in an embodiment in accordance with techniques herein.

Referring to FIG. 5, shown is an example of masking information that may be created and used in an embodiment in accordance with techniques herein. In the example 300, shown is a table of MVs for a plurality of hosts. Each row of the table denotes an MV instance in column 304 configured for a particular host identified in column 302 of the same row. The table 300 may index or provide access to MVs using the host's unique HOST NAME (column 302) as described elsewhere herein. For example, consider an embodiment in which the table 300 is indexed and accessed by HOST NAME in column 302. (e.g., Each host's HOST NAME denoted in column 302 uniquely identifies a particular host). Generally, the example 300 uses the notation PGn, n being an integer greater than 0, to identify an instance of a PG; uses the notation IGn to identify and instance of an IG; and uses the notation SGn to identify an instance of a SG. In a PG, Pn may denote a target port WWN. In an IG, In may denote an initiator port WWN.

Row 310 may denote a first host having a HOST NAME of Name 1 (as in column 302 of row 310) with an MV as specified in column 304 of row 310. As illustrated in column 304 of row 310, the first host has a first MV including port group PG1, initiator group IG1, and storage group SG1. Row 312 may denote a second host having a HOST NAME of Name 2 (as in column 302 of row 312) with an MV as specified in column 304 of row 312. As illustrated in column 304 of row 312, the second host has a second MV including port group PG1, initiator group IG2, and storage group SG1. Note that SGs and PGs may be defined and reused in different MV instances for different hosts. For example, PG1 may be defined as a set of target ports of the data storage system and SG1 may be defined as a set of particular LUNs where both PG1 and SG1 are used in the MVs of rows 310 and 312. Row 314 may denote a third host having a HOST NAME of Name 3 (as in column 302 of row 314) with an MV as specified in column 304 of row 314. As illustrated in column 304 of row 314, the third host has a third MV including port group PG2, initiator group IG3, and storage group SG2.

In at least one embodiment in accordance with techniques herein, the host may perform processing, such as when the host is booted, to discover and establish connectivity between the host and data storage system. In particular, the host may perform processing to discover and establish connectivity with the switch (e.g., more generally network or switching fabric) and also between the switch and data storage system. For example, an HBA initiator port of a host may log into the switch and provide identifying information of the initiator port, such as the initiator port's WWN. The switch may provide the initiator port with information regarding what data storage system target ports are visible or exposed from the switch. In turn, the host initiator port may then proceed to login to the target ports of the data storage system where the host initiator port provides its WWN along with possibly other configuration information, such as the HOST NAME, sent during the login.

An embodiment in accordance with the techniques herein may define multiple service levels or service level objectives (SLOs) denoting different performance targets or goals. The data storage system may provide a multi-tenant (MT) environment whereby multiple tenants or clients, such as applications, store their data on the data storage system. In such an environment, a different SLO may be specified for different data sets that defines a target performance level for the particular data set used by the application. For example, an SLO may be related to a target level of performance or service with respect to I/O operations serviced at the data storage system. The SLO specified may be expressed in terms of one or more metrics, such as based on I/O RT, target I/O throughput (e.g., I/O rate such as I/Os per second), data throughput (e.g., megabytes per second), and the like. For example, the SLO specified may include an average RT with respect to I/Os issued to a particular logical defined data set. To further illustrate, an SLO may specify an average RT of 3 milliseconds (ms.) for a particular data set whereby the target or goal for the data set is to have an observed or measured average I/O RT of 3 ms. the data set, or for each LUN or storage object in the data set. The client, such as the DB application, may also be referred to as a consumer of the data storage system (and data storage system resources) where the consumer's data is stored on the data storage system. A single client or consumer may be, for example, an application executing on a host. A single host may have one or more applications. In at least one embodiment, an SLO may be specified for each logical group of one or more LUNs, such as a storage group (SG) of LUNs. More generally, as noted above, an SLO may be specified for a logical grouping of data storage objects. Additionally, as used herein, and SG may more generally refer to a logical grouping of one or more storage objects, where the storage objects may be generally any storage object (e.g., representing any logical entity or any physical entity, such as a physical storage device or portion of a physical storage device) in the data storage system.

Thus, the SLO associated with an SG or other logically defined group of one or more storage objects is one indicator regarding the importance or criticality of the data stored in the SG and regarding the application using such data.

In at least one embodiment, an SLO may be assigned to each defined logical SG of one or more LUNs, as noted above, where each/every I/O directed to any LUN of the SG has the same SLO (as specified for the SG).

In at least one embodiment, SLOs may be specified using the following predetermined service levels, from highest ranked service or performance level to lowest ranked service or performance level: DIAMOND (highest), GOLD, and BRONZE (lowest). Each of the foregoing service levels may have an associated SLO such as a specified RT goal. For example, DIAMOND may have a 1 millisecond RT goal (whereby I/Os directed to a LUN with a DIAMOND SLO may be serviced at the highest priority as soon as possible), GOLD may have a 2 millisecond RT goal, and BRONZE may have a 6 millisecond RT goal. It should be noted that other embodiments may have additional and/or different service levels than as noted above and used elsewhere herein for purposes of illustration. In at least one embodiment, the relative ranking of the SLOs may denote an I/O prioritization. The higher ranked an SLO, the higher the priority of the I/Os directed to a LUN assigned that particular SLO. For example, I/Os directed to a LUN having a BRONZE SLO have lower priority than other I/Os directed to a LUN having a DIAMOND SLO.

Generally, the SLO for a LUN may be characterized as the performance target or goal performance for the SG. The data storage system may perform processing to control, achieve or regulate I/Os and resources utilized for processing such I/Os in order to maintain the goals or targets of the SLO. An SLO violation may occur, for example, when the LUN's observed I/O RT does not meet the I/O RT specified by the SLO. An SLO violation may occur if the measured or observed I/O RT performance is lower than the target SLO performance (e.g., measured I/O RT>target I/O RT of the SLO). Responsive to such an SLO violation not meeting target performance of the SLO, remediation processing may be performed to attempt to alleviate, and, if possible, eliminate, the SLO violation.

Generally, it may be desirable to not let a first LUN with a high service level, such as DIAMOND, have its performance adversely impacted by a second LUN with a lower service level, such as BRONZE. In at least one existing system, responsive to an SLO violation occurring for the first LUN with the DIAMOND SLO, processing may be performed to assists the first LUN in meeting its DIAMOND SLO by lowering the first LUN's I/O RT. In this example, the SLO violation may occur where the first LUN with the DIAMOND SLO has an observed I/O RT>the target I/O RT of the DIAMOND SLO. In response, processing may include delaying execution of I/Os directed to other LUNs having a lower level of service or lower ranked SLO. For example, I/Os directed to the second LUN having the BRONZE SLO may be delayed to allow execution of other I/Os directed to the first LUN with the DIAMOND SLO. Allowing the I/Os directed to the first LUN having the DIAMOND SLO to be serviced or executed prior to other I/Os associated with LUNs of lower SLOs, such as BRONZE, may provide for an increase in performance/reduced I/O RT for the first LUN. However, once the I/Os directed to the second LUN with the BRONZE SLO are executed, resources consumed to service such I/Os may still adversely impact I/O performance of other LUNs, such as the first LUN, having a higher level of service or SLO than BRONZE.

In particular, the first LUN having the DIAMOND SLO (also referred to herein as DIAMOND level LUN) and the second LUN having the BRONZE SLO (also sometimes referred to herein as BRONZE level LUN) may be both be exposed over the same target port of the data storage system and the I/Os for both such LUNs may be received at the same target port. A read or write I/O having a large payload may be directed to the BRONZE level LUN. Executing such an I/O directed to the BRONZE level LUN may adversely impact the I/O RT performance of other LUNs having higher SLOs, such as the DIAMOND level LUN, exposed through the same target port as the BRONZE level LUN.

It may be desirable to have a mix of both higher and lower SLO I/Os received at the same data storage system target port. In other words, it may be desirable to have the DIAMOND level LUN and the BRONZE level LUN exposed through the same target port. However, it is generally desirable to not have I/Os directed to the BRONZE level LUN adversely impact the I/O performance of the DIAMOND level LUN on the same target port.

Described in following paragraphs are techniques that may be used to detect when a higher performance or service level LUN, such as the DIAMOND level LUN, has an SLO violation. In response to detecting the SLO violation where, for example, the DIAMOND level LUN is exposed over the same target port as one or more other LUNs having a lower ranked performance or service level (e.g., SLO level lower than DIAMOND), the techniques described herein may relocate the one or more LUNs having a lower SLO to a different path or different target port than the DIAMOND level LUN. As a variation, the techniques described herein may relocate the DIAMOND level LUN to a different path or target port than the one or more LUNs having a lower SLO than DIAMOND. In this manner, the techniques herein avoid the adverse performance impact on the DIAMOND level LUN by other LUNs having relatively lower service levels or SLOs (e.g., lower than DIAMOND. Such relocation and separation of the DIAMOND level LUN from the other LUNS with lower SLOs may be needed, for example when the lower level SLO LUN is adversely impacting the performance of the DIAMOND level LUN serviced through the same target port of the data storage system. In at least one embodiment in accordance with the techniques herein, relocation of one or more LUNs to a different target port or path may be performed by dynamically modifying the masking information on the data storage system.

Figure 6:
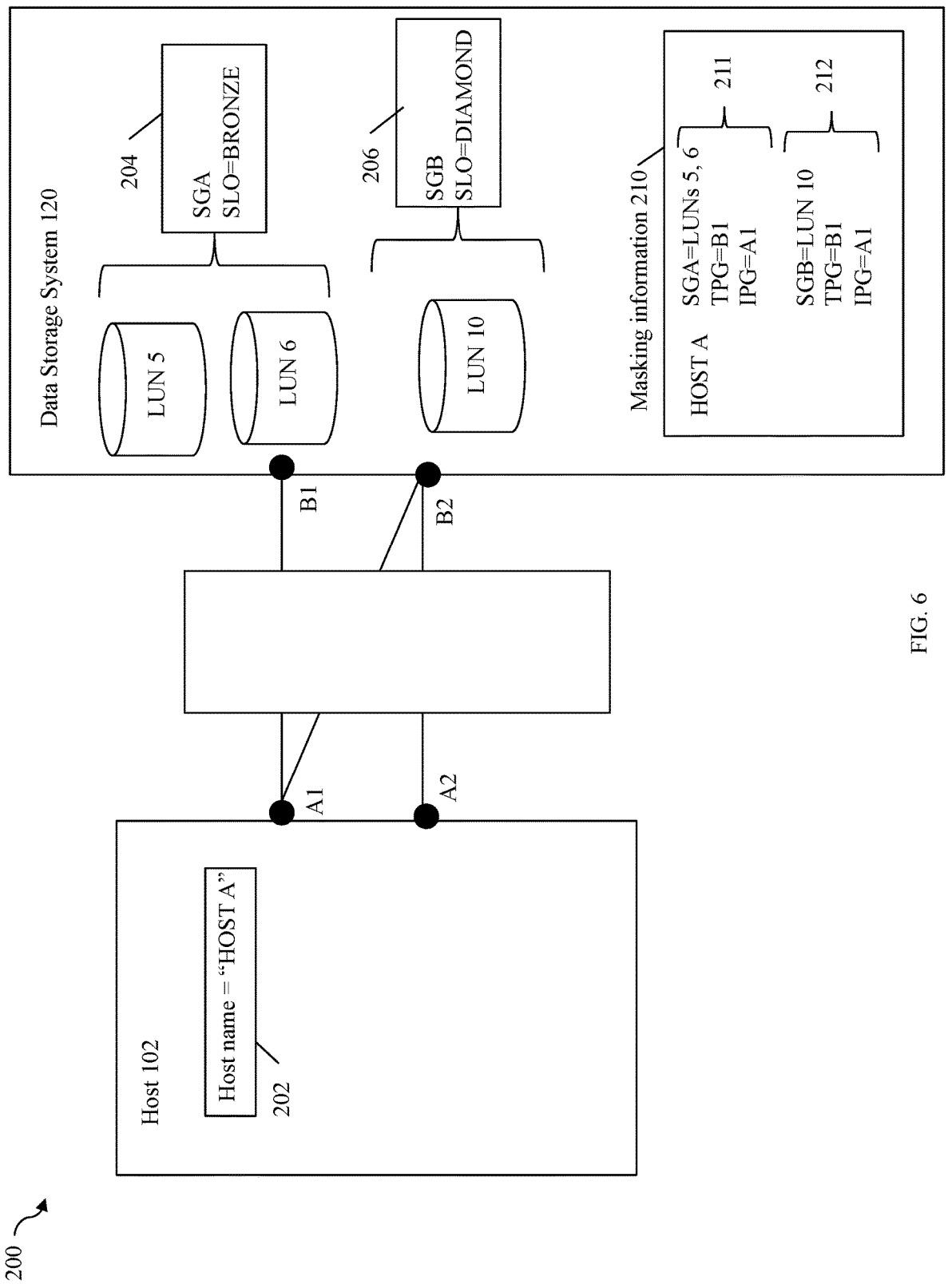
FIG. 6 is an example illustrating systems, components and masking information prior to updating the masking information in an embodiment in accordance with the techniques herein.

Referring to FIG. 6, shown is an example of systems and components in an embodiment in accordance with the techniques herein. The example 200 includes systems and components as described above, such as in connection with FIG. 5, with further detail omitted for simplicity of illustration.

The example 200 includes the host 102 and the data storage system 120. As denoted by 202, the host 102 includes has the host name of "HOST A". In the example 200, assume that the switch 140 is zoned to only have the 3 paths as illustrated: path 1 from A1 to B1 (also referenced herein as A1-B1); path 2 from A2 to B2 (also referenced herein as A1-B2); and path 3 from A1 to B2 (also referenced herein as A1-B2). In at least one embodiment, the switch 140 may be zoned to provide connections to LUNs 5, 6 and 10 over all the foregoing 3 paths. However, as discussed below, the masking information 210 indicates that only the path 1 A1-B1 is actually used to expose LUNs 5, 6 and 10 to the host A, host 102. Consistent with other discussion herein, the one or more paths over which the host 102 is allowed to issue I/Os to the data storage system may be based on a combination of zoning and masking. In some instances such as in the example 200, the zoning of the switch 140 may define more connections or paths than actually indicated as allowed for use by the masking information 210.

The data storage system 120 includes 3 LUNs, LUN 5, LUN 6 and LUN 10. In the example 200 as denoted by element 204, storage group SGA is configured to include LUN 5 and LUN 6, where SGA has an SLO=BRONZE. In the example 200 as denoted by element 206, storage group SGB is configured to include LUN 10, where SGB has an SLO=DIAMOND.

Element 211 of the masking information 210 indicates that SGA, and thus LUNs 5 and 6, are exposed over the single path A1-B1. Element 212 of the masking information 210 indicates that SGB, and thus LUN 10, is exposed over the single path A1-B1. Thus the masking information 210 indicates that the LUNs 5, 6 and 10 are all exposed and visible to the host 102 over the same single path A1-B1. Thus, the host 102 is allowed to issue I/O operations to the LUNs 5, 6 and 10 over the same single path A1-B1.

At a first point in time, assume that both SG A and SG B are meeting their specified SLO performance targets, such as target I/O RTs. At a second later point in time, assume that a first set of read and write I/Os are issued by the host 102 to the LUNs 5 and 6 of SG A where such I/Os have very large payloads. As a result of the host issuing the first set of read and write I/Os to LUNs 5 and 6 of SGA, the I/O RT for I/Os directed to LUN 10 of SGB is adversely impacted. In particular, the observed I/O RT for LUN 10 increases above the I/O RT target of 1 ms. as defined for the DIAMOND SLO thereby triggering an SLO violation for LUN 10. In at least one embodiment, the data storage system may detect the foregoing SLO violation for LUN 10 and, in response, may perform processing in accordance the techniques herein to alleviate the SLO violation. The processing may include isolating or separating the adversely impacted LUN 10 (having the higher performance DIAMOND SLO) from the other LUNs 5 and 6 (having a lower BRONZE SLO) that are also exposed for I/Os over the same path A1-B1.

In at least one embodiment, the processing may include relocating one or more of the LUNs 5 and 6 having the lower level BRONZE SLO. In such an embodiment, the relocation of the LUNs 5 and 6, and thus SG A, may be performed by modifying the masking information to expose SG A over a different target port of the data storage system. In the example 200, the dynamic masking change made to the masking information 210 may relocate or expose the LUNs 5 and 6 over target port B2 rather than B1.

Figure 7:
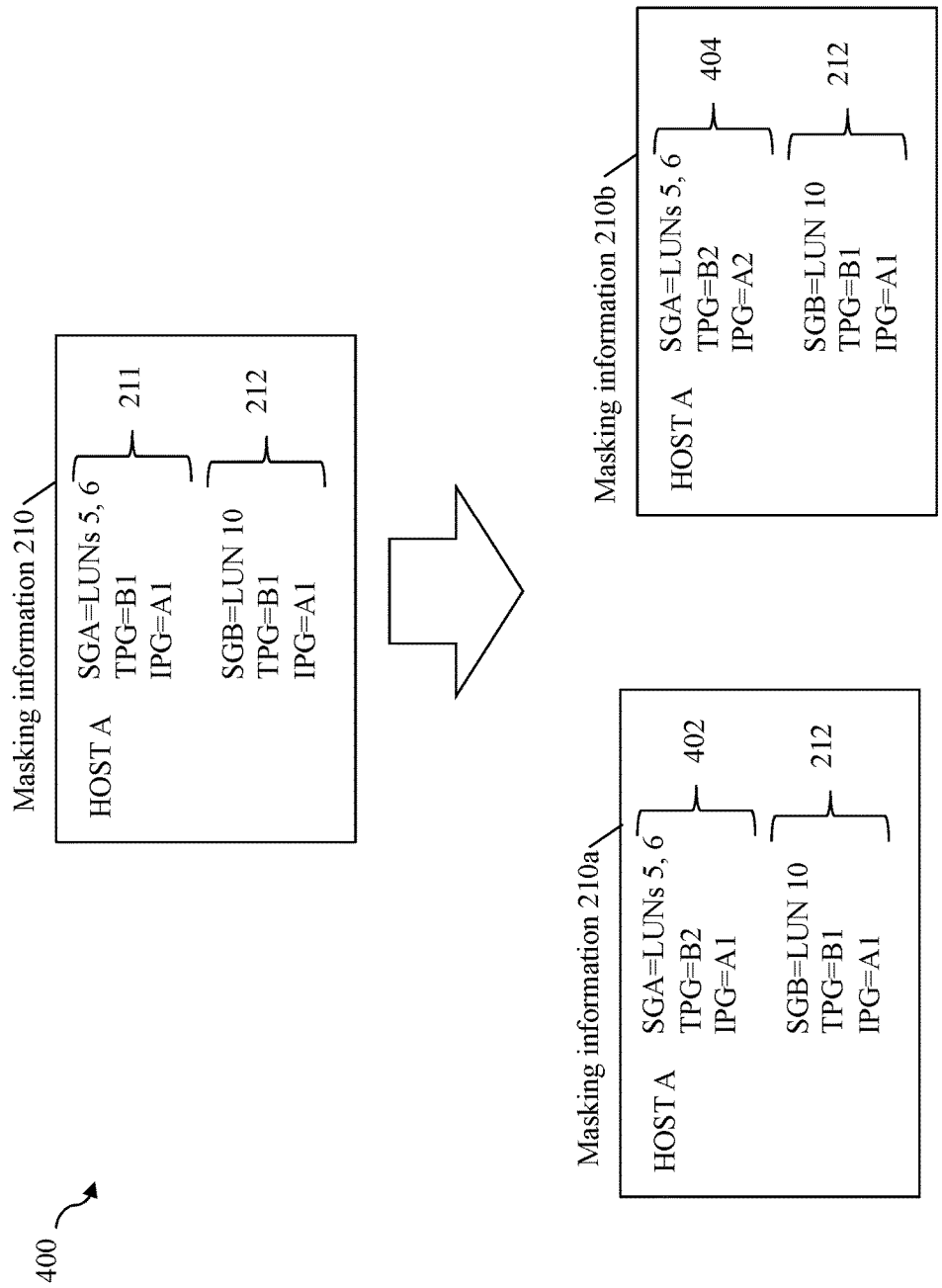
FIGS. 7 and 8 are examples illustrating various ways in which the masking information may be updated in an embodiment in accordance with the techniques herein.

Referring to FIG. 7, shown is an example 400 illustrating various ways in which the mapping information 210 for the host 102 may be updated to effectively relocate or expose LUNs 5 and 6 over target port B2 rather than B1. The masking information 210 denotes the same masking information as illustrated in FIG. 6 prior to modification. Element 210a denotes a first way in which the mapping information 210 may be updated to expose LUNs 5 and 6 over target port B2. Element 210b denotes a second alternative way in which the mapping information 210 may be updated to expose LUNs 5 and 6 over target port B2. Thus, the dynamic masking information modification may be implemented in one or more ways depending on the particular configuration.

In the first version of the updated mapping information as denoted by the element 210a, the information 211 has been replaced with new information 402. The new information 402 indicates that LUNs 5 and 6 of SG A are exposed to the host 102 over the path or connection A1-B2. In the second version of the updated mapping information as denoted by the element 210b, the information 211 has been replaced with new information 404. The new information 404 indicates that LUNs 5 and 6 of SG A are exposed to the host 102 over the path or connection A2-B2.

In at least one embodiment, the foregoing updating of the masking information 210 to either 210a or 210b may be performed automatically by the data storage system as part of processing performed responsive to the SLO violation detection for LUN 10. Once the masking information has been updated, the data storage system may send a notification to the host regarding the updated masking information. In at least one embodiment, the notification may be sent in an asynchronous manner from the data storage system 120 to the host 102 using any suitable and supported mechanism that may vary with embodiment. The notification may be used to identify or generally provide notification to the host regarding the two target ports of the data storage system affected by the masking information update.

In at least one embodiment using the NVMe over FC standard, the data storage system 120 may send an asynchronous event notification (AEN) to the host 102 to provide notification of the update of the masking information. The AEN notification may identify the two target ports of the data storage system that were affected by the masking information update. In such an embodiment using the NVMe standard as known in the art and described elsewhere herein, each path or physical link may generally include one or more logical connection, streams or queues. As described in connection with FIG. 9 elsewhere herein with NVMe, a different logical connection within the same path may be exist and be used for each of the SGs A and B. In such an embodiment, the masking information may be updated to reflect that one of the logical connections from one path or physical link has been moved or relocated to another path. In response to such relocation or movement of the logical connection between paths, the masking information is updated and the data storage system 120 may accordingly send an AEN notification to the host 102.

In at least one embodiment using the SCSI over FC standard, the data storage system 120 may use a check condition (chk-cond) to provide the host 102 regarding the notification of the update of the masking information. Prior to updating the masking information, the masking information may indicate that I/Os directed to a particular LUN are allowed to be sent on a particular path. However, the updated masking information now indicates the opposite—that the data storage system will not service I/Os that are sent on the particular path and that are directed to the particular LUN. In such an embodiment, subsequent to the masking information update or change, the host 102 may continue to send I/Os on the particular path to the particular LUN. However, subsequent to updating the masking information, the data storage system does not service the I/O operations and rather returns an error status or check condition to the host in response to the I/Os (sent subsequent to the masking information update). As a result of receiving the check condition following the masking information update, the host is notified regarding the update or change in the masking information. In response to receiving the AEN notification (e.g., NVMe standard), check condition notification (e.g., SCSI standard), or other suitable notification regarding the updating of masking information, the host 102 may perform processing to acquire information regarding the update. The host 102 may perform discovery processing to rediscover the LUNs exposed or visible over the particular target ports as a result of the updated masking information. For example, the HBA ports A1 and A2 may perform processing to rediscover the LUNs exposed or visible over the particular target ports as a result of the updated masking information.

Subsequent to updating the masking information 210 to either 210a or 210b, the LUNs 5 and 6 having the BRONZE SLO are now exposed through, and serviced by, the target port B2. Subsequently issued I/Os directed to the LUNs 5 and 6 are now issued over either path A1-B2 (if element 210a denotes the updated masking information) or path A2-B2 (if element 210b denotes the updated masking information). Subsequent to updating the masking information 210 to either 210a or 210b, subsequently issued I/Os directed to the LUN 10 are now issued over the path A1-B1 without the adverse impact previously experienced due to the I/Os directed to the LUNs 5 and 6 having the BRONZE level SLO being received at the same target port as the I/os directed to LUN 10.

As mentioned above, rather than relocate the LUNs 5 and 6, another option is to relocate or expose LUN 10 through a different target port, such as B2. In at least one embodiment, the processing may include relocating LUN 10 having the higher level DIAMOND SLO. In such an embodiment, the relocation of the LUN 10, and thus SGB, may be performed by modifying the masking information to expose SG B over a different target port of the data storage system. In such an embodiment, the dynamic masking change made to the masking information 210 may relocate or expose the LUN 10 over target port B2 rather than B1.

Figure 8:
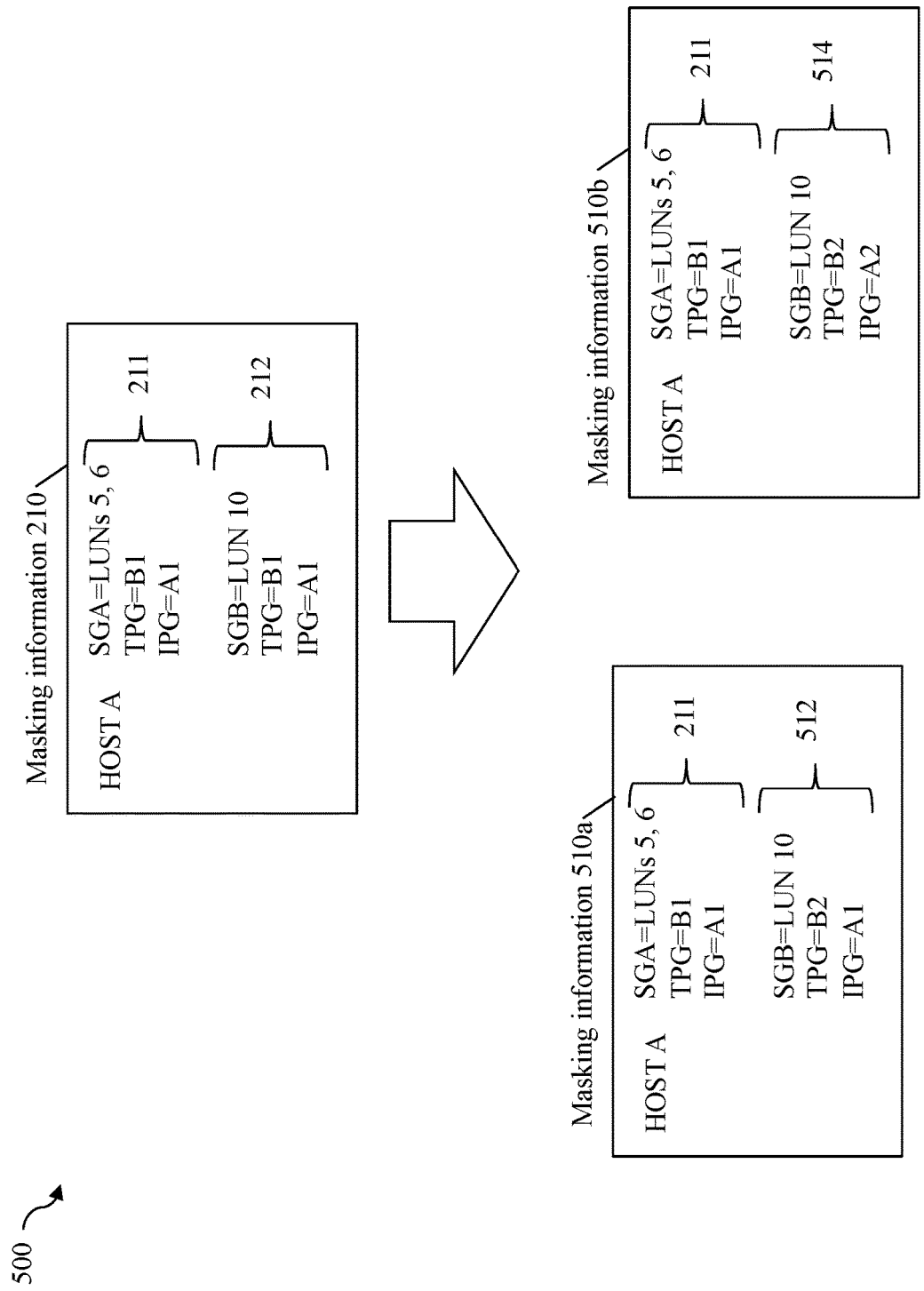

Referring to FIG. 8, shown is an example 500 illustrating various ways in which the mapping information 210 for the host 102 may be updated to effectively relocate or expose LUN 10 over target port B2 rather than B1. The masking information 210 denotes the same masking information as illustrated in FIG. 6 prior to modification. Element 510a denotes a first way in which the mapping information 210 may be updated to expose LUN 10 over target port B2. Element 510b denotes a second alternative way in which the mapping information 210 may be updated to expose LUN 10 over target port B2. Thus, the dynamic masking information modification may be implemented in one or more ways depending on the particular configuration.

In the first version of the updated mapping information as denoted by the element 510a, the information 212 has been replaced with new information 512. The new information 512 indicates that LUN 10 of SG B is exposed to the host 102 over the path or connection A1-B2. In the second version of the updated mapping information as denoted by the element 510b, the information 212 has been replaced with new information 514. The new information 514 indicates that LUN 10 of SG B is exposed to the host 102 over the path or connection A2-B2.

In at least one embodiment, the foregoing updating of the masking information 210 to either 510a or 510b may be performed automatically by the data storage system as part of processing performed responsive to the SLO violation detection for LUN 10. Once the masking information has been updated, the data storage system may send a notification to the host regarding the updated masking information. In at least one embodiment, the notification may be sent in an asynchronous manner from the data storage system 120 to the host 102 using any suitable and supported mechanism that may vary with embodiment. The notification may be used to identify or generally provide notification to the host regarding the two target ports of the data storage system affected by the masking information update. Consistent with discussion elsewhere herein, such as in connection with FIG. 7, any suitable notification mechanism or technique may be used that may vary with embodiment. Non-limiting examples of such mechanisms are discussed elsewhere herein, such as in connection with FIG. 7.

In response to receiving the AEN notification (e.g., NVMe standard), check condition notification (e.g., SCSI standard), or other suitable notification regarding the updating of masking information, the host 102 may perform processing to acquire information regarding the update. The host 102 may perform discovery processing to rediscover the LUNs exposed or visible over the particular target ports as a result of the updated masking information. For example, the HBA ports A1 and A2 may perform processing to rediscover the LUNs exposed or visible over the particular target ports as a result of the updated masking information.

Subsequent to updating of the masking information 210 to either 510a or 510b, the LUN 10 having the DIAMOND SLO is now exposed through, and serviced by, the target port B2. Subsequently issued I/Os directed to the LUN 10 are issued over either path A1-B2 (if element 510a denotes the updated masking information) or path A2-B2 (if element 510b denotes the updated masking information) without the adverse impact previously experienced due other I/Os directed to the LUNs 5 and 6 being received at the same target port as I/Os for LUN 10. Subsequent to updating the masking information 210 to either 510a or 510b, subsequently issued I/Os directed to the LUNs 5 and 6 are now issued over the path A1-B1.

The foregoing describes an example illustrating use of the techniques herein in connection with a protocol, such as a particular implementation using a version of the SCSI protocol over FC, that may be characterized as using only a single logical connection per specified path or physical link between a host port and a data storage system port over which LUNs are exposed or visible for I/O operations. Generally, the single logical connection may denote a single logical stream or queue of I/Os that may be issued sequentially over the single logical connection.

As a variation, the techniques herein may be used in connection with an embodiment in which there are multiple logical connections, streams or queues per specified path or physical link. For example, an embodiment may use the NVMe over FC protocol to define and use multiple logical connections in a single path or physical link. In such an embodiment, the multiple logical connections may be implemented using multiple logical entities operating over the same path or physical link. In at least one embodiment using NVMe, the HBA on the host may implement multiple dynamic controllers as the host side logical entities of the multiple logical connections of the same path. The host side logical entities have a corresponding data storage system side logical entity forming the multiple logical connections, queues or streams. A single logical connection may be between one of the host side logical entities and a corresponding one of the data storage system side logical entities. The logical connections on the same path of physical link may share resources of the same path or physical link. The multiple logical connections operating on the same path or physical link may operate in parallel. Each of the logical connections may operate independently of the other remaining logical connections. I/Os may be sent in parallel over the multiple logical connections on the same path or physical link at the same time.

Figure 9:
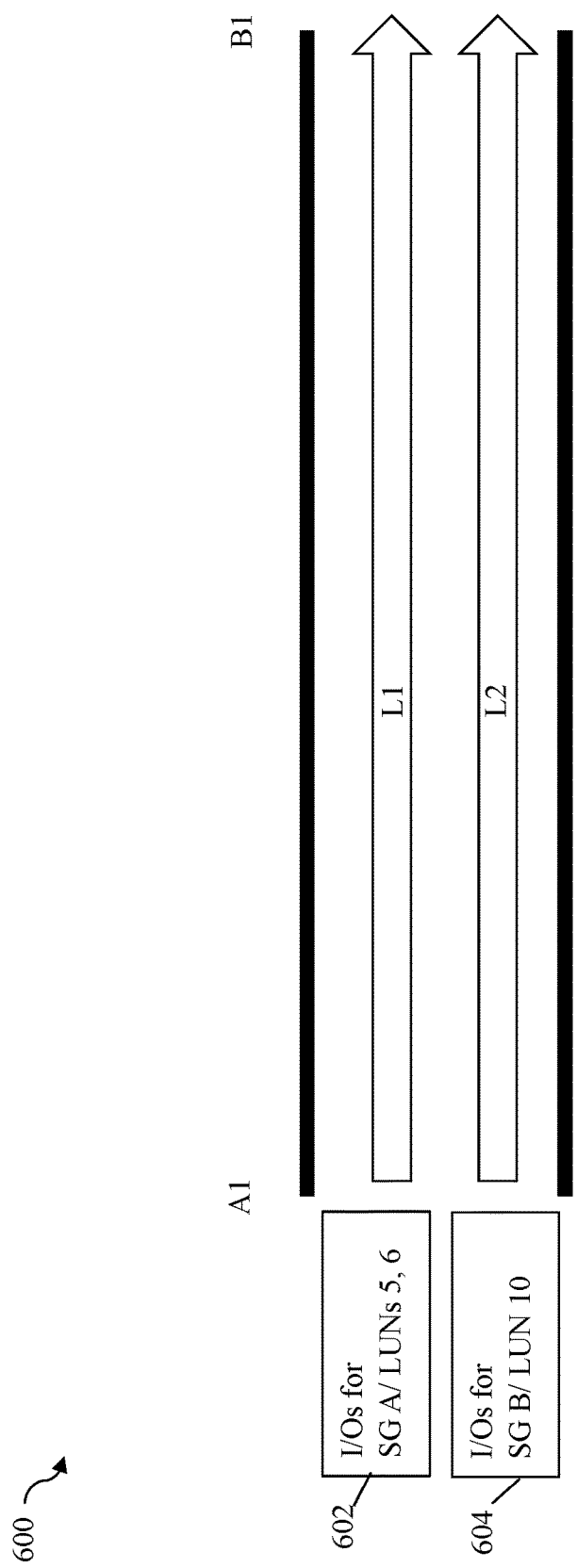
FIGS. 9 and 10 illustrate use of the techniques herein in an embodiment in which multiple logical connections may be configured for a single path or physical link.

Referring to FIG. 9, shown is an example illustrating multiple logical connections over a single path or physical link in an embodiment in accordance with the techniques herein prior to updating the masking information.

The example 600 illustrates the single path or physical link A1-B1 as described in connection with FIG. 6 prior to updating the masking information. The example 600 illustrates an embodiment in which 2 logical connections, streams or queues of I/Os may be configured for the single path or physical link A1-B1. In this example, L1 may denote one of the logical connections used to send I/Os 602 directed to LUNs 5 and 6 of SG A. L2 may denote a second of the logical connections used to send I/Os 604 directed to the LUN 10 of SG B. It should be noted that although only 2 logical connections are illustrated for the single path, an embodiment may include any suitable number of logical connections configured for the single path. The number of logical connections allowable for configuration over the single path may vary with embodiment. In one aspect, the number of logical connections allowable may depend on the particular protocol or standards, vendor implementation, and the like.

Figure 10:
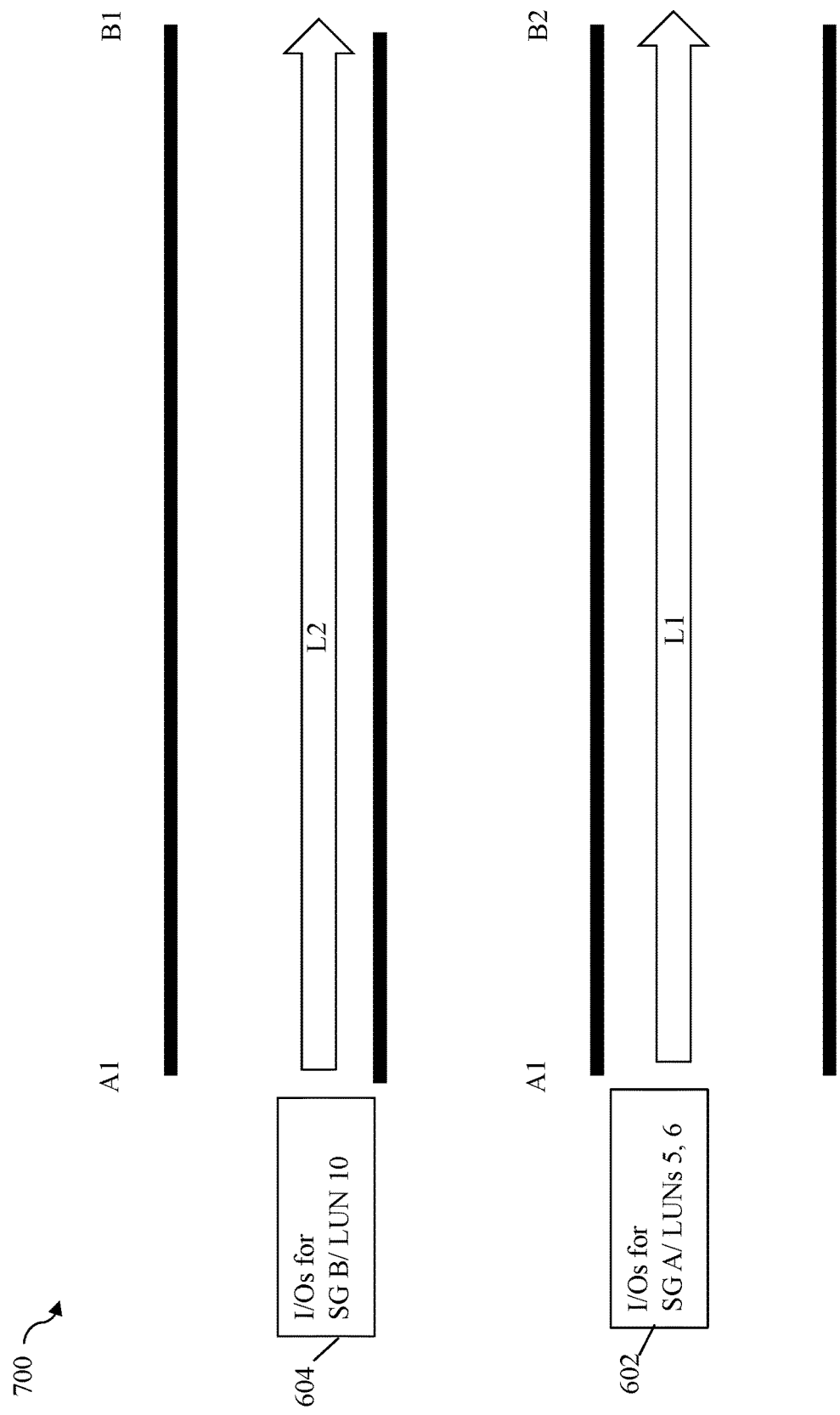

FIG. 9 illustrates one configuration of the path or physical link that corresponds to the masking information 210. As discussed in connection with FIGS. 6 and 7, the masking information 210 may be updated to effectively relocate or expose the LUNs 5 and 6 of SG B over another path, such as the path A1-B2. With reference now to FIG. 10, shown is an example illustrating the exposure of the LUNs 5, 6 and 10 over ports of the data storage system after the masking information 210 is updated to the particular version of masking information 210a in which the SG A of LUNs 5 and 6 is relocated or exposed over the path A1-B2 rather than A1-B1. In the example 700, the logical connection L1 is effectively relocated or moved from the path A1-B1 to the path A1-B2.

In a similar manner to that as illustrated in FIG. 10, in an embodiment in which the masking information is updated to 210b rather than 210a, the logical path L1 may be effectively relocated or moved from the path A1-B1 to the path A2-B2.

In a similar manner to that as illustrated in FIG. 10, in an embodiment in which the masking information is updated to 510a rather than 210a, the logical path L2 may be effectively relocated or moved from the path A1-B1 to the path A1-B2.

In a similar manner to that as illustrated in FIG. 10, in an embodiment in which the masking information is updated to 510b rather than 210a, the logical path L2 may be effectively relocated or moved from the path A1-B1 to the path A2-B2.

Figure 11:
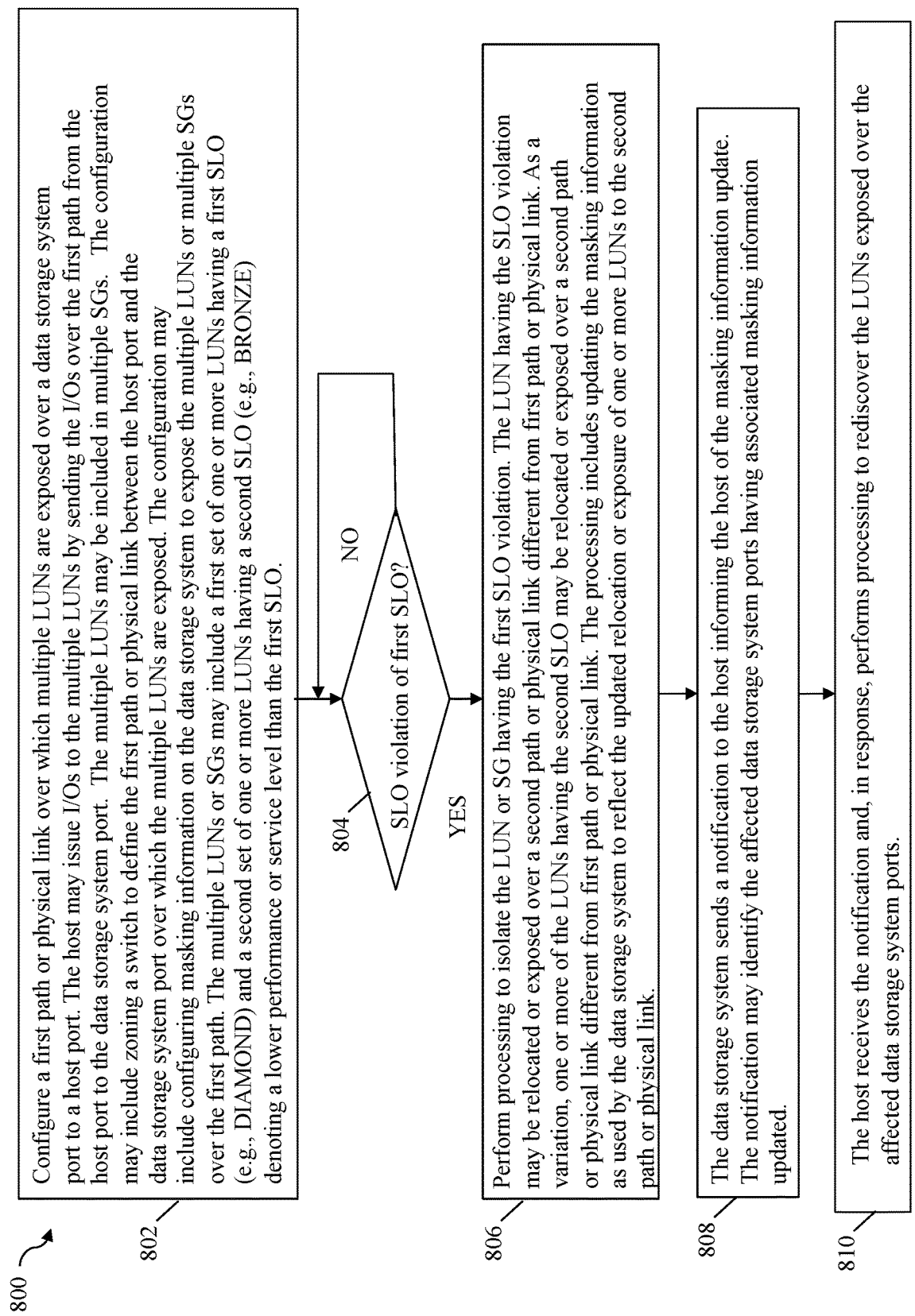
FIG. 11 is a flowchart of processing steps that may be performed in an embodiment in accordance with the techniques herein.

Referring to FIG. 11, shown is a flowchart of processing steps that may be performed in an embodiment in accordance with the techniques herein. The flowchart 800 summarizes processing described above.

At the step 802, processing may be performed to configure a first path or physical link over which multiple LUNs are exposed over a data storage system port to a host port. The host may issue I/Os to the multiple LUNs by sending the I/Os over the path from the host port to the data storage system port. The multiple LUNs may be included in multiple SGs. The configuration may include zoning a switch to define the first path or physical link between the host port and the data storage system port over which the multiple LUNs are exposed. The configuration may include configuring masking information on the data storage system to expose the multiple LUNs or multiple SGs over the first path. The multiple LUNs or SGs may include a first set of one or more LUNs having a first SLO (e.g., DIAMOND) and a second set of one or more LUNs having a second SLO (e.g., BRONZE) denoting a lower performance or service level than the first SLO. From the step 802, processing proceeds to the step 804.

At the step 804, a determination is made as to whether an SLO violation of the first SLO has occurred for any LUN of the first set. Processing remains at the step 804 until the step 804 evaluates to yes. If the step 804 evaluates to yes, processing proceeds to the step 806.

At the step 806, processing is performed to isolate the LUN or SG having the first SLO violation detected in the step 804. The LUN having the SLO violation may be relocated or exposed over a second path or physical link different from first path or physical link. As a variation, one or more of the LUNs having the second SLO (and causing the SLO violation) may be relocated or exposed over a second path or physical link different from first path or physical link. The processing includes updating the masking information as used by the data storage system to reflect the updated relocation or exposure of one or more LUNs to the second path or physical link. From the step 806, processing proceeds to the step 808.

A the step 808, the data storage system sends a notification to the host informing the host of the masking information update. The notification may identify the affected data storage system ports having associated masking information updated. From the step 808, processing proceeds to the step 810.

At the step 810, the host receives the notification and, in response, performs processing to rediscover the LUNs exposed over the affected data storage system ports. The processing of the step 810 discovers the new configuration or reconfiguration of which LUNs are exposed or over which data storage system ports to which host ports.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of configuring paths for transmitting I/O operations comprising:
configuring a first path over which a plurality of logical devices are exposed over a first port of a data storage system to a second port of a host, wherein the plurality of logical devices includes a first logical device having a first service level objective and a second logical device having a second service level objective denoting a lower service level than the first service level objective, wherein masking information indicates that the first logical device and the second logical device are exposed over the first port of the data storage system to the second port of the host;
determining whether there is a service level objective violation of the first service level for the first logical device; and
responsive to determining that there is a service level objective violation of the first service level for the first logical device, performing first processing that exposes the first logical device and the second logical device over different ports of the data storage system.

2. The method of claim 1, wherein the first processing includes updating the masking information to relocate one of the first logical device and the second logical device from the first port of the data storage system to a third port of the data storage system.

3. The method of claim 2, wherein the first processing includes relocating the first logical device from the first port to the third port of the data storage system whereby the first logical device is exposed to the host over the third port of the data storage system and the second logical device is exposed over to the host the first port of the data storage system.

4. The method of claim 2, wherein the first processing includes relocating the second logical device from the first port to the third port of the data storage system whereby the second logical device is exposed to the host over the third port of the data storage system and the first logical device is exposed to the host over the first port of the data storage system.

5. The method of claim 2, further comprising:
responsive to updating the masking information, sending a notification to the host.

6. The method of claim 5, wherein the notification identifies a plurality of ports of the data storage system having a configuration change due to the updating of the masking information, wherein the plurality of ports of the data storage system include the first port and the third port of the data storage system.

7. The method of claim 6, wherein the host performs discovery processing responsive to receiving, and wherein said discovery processing rediscovers which logical devices are exposed over the first port and the third port of the data storage system.

8. The method of claim 1, wherein the first service level objective is an I/O performance objective for the first logical device, wherein the second service level objective is an I/O performance objective for the second logical device, and wherein I/Os directed to the first logical device have higher priority than I/Os directed to the second logical device.

9. The method of claim 8, wherein the first service level objective includes a first I/O performance target metric for the first logical device and wherein the second service level objective includes a second I/O performance target metric for the second logical device.

10. The method of claim 9, wherein the first I/O performance target metric denotes a first I/O response time target for I/Os directed to the first logical device, and wherein the second I/O performance target metric denotes a second I/O response time target for I/Os directed to the second logical device.

11. The method of claim 10, wherein the service level objective violation of the first service level for the first logical device occurs when an observed I/O response time for I/Os directed to the first logical device exceeds the first I/O response time target.

12. A system comprising:
one or more processors; and
a memory comprising code stored thereon that, when executed, performs a method of configuring paths for transmitting I/O operations comprising:
configuring a first path over which a plurality of logical devices are exposed over a first port of a data storage system to a second port of a host, wherein the plurality of logical devices includes a first logical device having a first service level objective and a second logical device having a second service level objective denoting a lower service level than the first service level objective, wherein masking information indicates that the first logical device and the second logical device are exposed over the first port of the data storage system to the second port of the host;
determining whether there is a service level objective violation of the first service level for the first logical device; and
responsive to determining that there is a service level objective violation of the first service level for the first logical device, performing first processing that exposes the first logical device and the second logical device over different ports of the data storage system.

13. A computer readable medium comprising code stored thereon that, when executed, performs a method of configuring paths for transmitting I/O operations comprising:
configuring a first path over which a plurality of logical devices are exposed over a first port of a data storage system to a second port of a host, wherein the plurality of logical devices includes a first logical device having a first service level objective and a second logical device having a second service level objective denoting a lower service level than the first service level objective, wherein masking information indicates that the first logical device and the second logical device are exposed over the first port of the data storage system to the second port of the host;
determining whether there is a service level objective violation of the first service level for the first logical device; and
responsive to determining that there is a service level objective violation of the first service level for the first logical device, performing first processing that exposes the first logical device and the second logical device over different ports of the data storage system.

14. The computer readable medium of claim 13, wherein the first processing includes updating the masking information to relocate one of the first logical device and the second logical device from the first port of the data storage system to a third port of the data storage system.

15. The computer readable medium of claim 14, wherein the first processing includes relocating the first logical device from the first port to the third port of the data storage system whereby the first logical device is exposed to the host over the third port of the data storage system and the second logical device is exposed over to the host the first port of the data storage system.

16. The computer readable medium of claim 14, wherein the first processing includes relocating the second logical device from the first port to the third port of the data storage system whereby the second logical device is exposed to the host over the third port of the data storage system and the first logical device is exposed to the host over the first port of the data storage system.

17. The computer readable medium of claim 14, wherein the method further comprises:
responsive to updating the masking information, sending a notification to the host.

18. The computer readable medium of claim 17, wherein the notification identifies a plurality of ports of the data storage system having a configuration change due to the updating of the masking information, wherein the plurality of ports of the data storage system include the first port and the third port of the data storage system.

19. The computer readable medium of claim 18, wherein the host performs processing discovery processing responsive to receiving, and wherein said discovery processing rediscovers which logical devices are exposed over the first port and the third port of the data storage system.

20. The computer readable medium of claim 13, wherein the first service level objective is an I/O performance objective for the first logical device, wherein the second service level objective is an I/O performance objective for the second logical device, and wherein I/Os directed to the first logical device have higher priority than I/Os directed to the second logical device.

\* \* \* \* \*